3,258,450
PROCESS FOR MAKING PHENOL MODIFIED
POLYDIENE RESINS
Eli J. Aronoff, Queens, Henry B. Yuska, Kew Gardens, Guy J. Del Franco, Brooklyn, and Anthony M. Fusco, New Rochelle, N.Y., assignors to Interchemical Corporation, New York, N.Y., a corporation of Ohio
No Drawing. Filed Apr. 27, 1962, Ser. No. 190,824
9 Claims. (Cl. 260—62)

This invention relates to novel phenol modified polydiene resins and more particularly to phenol alkylated by polydiene resins.

We have discovered a new process which permits the alkylation of phenols by polydiene resins to produce novel resins which are soluble in organic solvents and useful as antioxidants, lubrication oil additives that prevent sludge formation, curing agents for butyl rubber and in coating compositions.

In accordance with this invention, a phenol material is alkylated by treating said phenol with a polydiene resin in the presence of an acid activated clay catalyst preferably comprising a mixture of activated clay and sulfuric acid, most preferably concentrated sulfuric acid, e.g. 100% sulfuric acid. The polydiene resin is preferably a polymer of butadiene or a substituted butadiene and contains more than 5 repeating units of said butadiene per molecule. Suitable polymers include polymers of conjugated dienes retaining residual unsaturation, particularly polymers comprising such monomeric materials as butadiene as well as substituted butadienes including isoprene, 2,3-dimethyl butadiene, 1-phenyl butadiene and 1,4-diphenyl butadiene. For purposes of describing this invention, cyclopentadiene is to be regarded as a 1,4-alkyl substituted butadiene since it behaves like a butadiene, polymerizing by means of the 1,4-carbons:

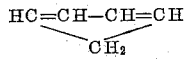

in the resin used to alkylate the phenol material. The polydiene resin may be a copolymer of the butadiene or substituted butadiene with monomers such as styrene, mono-olefins such as butylene, acrylonitrile, acrylates and methacrylates. It is to be understood that even such copolymers should contain more than five repeating butadiene or substituted butadiene units per molecule. It should also be understood that the repeating units need not be consecutive.

In the polydiene resins other than those containing cyclopentadiene, it is most preferable that at least 10% of the butadiene unsaturation in the polydiene resin be 1,2-unsaturation. Accordingly, materials such as natural rubber which has more than 95% 1,4-unsaturation would result in resins having less desirable properties.

With respect to the phenols which are alkylated, it has been found that the process of this invention is effective using both unsubstituted phenols, which are preferred, and substituted phenols provided that the latter are not substituted to such an extent that alkylation is prevented by steric hindrance. While the process is operable using substituted phenols such as halophenols including chlorophenols, alkyl phenols e.g., 1-hydroxy-3,5-dimethyl benzene, cresol and xylenol and aryl phenols such as p-phenyl phenol, the best results and those producing the novel resins of this invention employ unsubstituted phenols such as phenol, diphenols including Bisphenol A (2,2-diphenol propane) and p,p'-dihydroxy diphenyl, naphthols, anthrol and resorcinol. Of the foregoing unsubstituted phenols, phenol, Bisphenol A and naphthol provide the most desirable novel resins.

The novel resins of this invention preferably comprise up to 40% phenol material and most preferably from 5 to 30% of said phenol material. (It should be noted that unless otherwise specified all proportions set forth in this specification and claims are by weight.) In carrying out the reaction it has been found to be desirable to use an excess, preferably up to over 100% excess, of phenol above the amount which it is desired to incorporate.

The reaction between the polydiene resin and the phenol material is most preferably conducted in a hydrocarbon solvent such as xylene, toluene and benzene and preferably substituted benzene e.g., chlorobenzene and nitrobenzene and in the presence of a catalyst comprising a mixture of activated clay and sulfuric acid, preferably concentrated sulfuric acid. For best results, the catalyst should comprise from 2 to 4 parts of clay per part of concentrated sulfuric acid. The total catalyst weight should preferably be from about 0.1% to about 1.0% of the combined weight of the reactants. For best results, the reaction is conducted at elevated temperatures of from 50° to 120° C. and most preferably from 80° to 120° C. The reaction is advantageously conducted under an inert atmosphere. According to one embodiment of this process, the clay and sulfuric acid are slurried and mixed with the reactants. After the reaction is completed, the clay is removed, conveniently by filtration and the excess phenol may be removed by steam distillation or by precipitation of the reaction products in methanol which serves to remove the phenol. The resulting thermoplastic resins have relatively low softening points; they are fluids at room temperature. The exact softening point will vary with the composition of each resin. However, all the novel resins of this invention have softening points below 22° C. Because of the high functionality of both the reactants, especially the phenol materials, it is indeed surprising that when using higher quantities of phenol (more than 5%) the resulting novel resins remain in the liquid state rather than gelling or hardening. The resins of this invention are soluble in organic solvents including aromatics such as xylene, benzene and toluene, aliphatics such as heptane as well as commercial naphthas.

In accordance with another aspect of this invention, it has been found that acetylation of the novel resin enhances the properties of coating compositions containing these resins by reducing the tackiness of films of such coating compositions. Acetylation may be accomplished by treating the resins with acetic anhydride. Preferably from 5 to 10 parts of acetic anhydride are employed per 100 parts of resin. One convenient method is to reflux the acetic anhydride and resin together. The acetylation takes place at the hydroxy groups of the phenol.

In accordance with a further aspect of this invention, the novel phenol modified resins are methylolated in order to improve thermosetting characteristics of the resins, particularly, when such resins are to be used in coating compositions. The methylolation may be accomplished by reacting the phenol modified resins and formaldehyde using the conventional methods of methylolating phenol with a "basic type of catalyst." Suitable catalysts include sodium hydroxide, ammonium hydroxide, benzylamine, morpholine and other amines. The reaction is preferably accomplished at elevated temperatures, most preferably at reflux. It is preferable to employ from 0.5 mole to 3 moles and most preferable to use from 2 to 3 moles of formaldehyde for each mole of phenol which is incorporated in the resin. It should be noted that this methylolation reaction is primarily an addition reaction with little or no water being formed.

In order to prevent condensation between methylol groups on the phenol components and the consequent cross-linking of such methylolated phenol components, it has been found to be preferable to have an aliphatic alcohol such as butanol present during the reaction between the phenol modified resins and formaldehyde. The butanol etherifies the hydroxy methyl groups (methylol) to form butoxymethyl groups and thus impedes condensation between methylol groups. Preferably from 0.8 to 2 moles of butanol should be present for each mole of formaldehyde.

In accordance with another aspect of this invention, we have found that blends of the novel resins of this invention and epoxy resins in solutions of volatile organic solvents provide very desirable coating compositions particularly for metals. These coated metals may be used, for example, in food and beverage cans.

The epoxy resins which give good results include those conventionally prepared by reacting a polyhydric phenol particularly Bisphenol A with epichlorohydrin as well as epoxidized hydrocarbon resins e.g. Oxiron 2000 which is defined in the examples which follow. Preferably from 2 to 5 parts of epoxy resin are blended for each part of the resin of this invention (either methylolated or unmethylolated). The blends are in solutions of volatile organic solvents preferably having solids contents from 40% to 60%.

The solvents, the relative desirabilities of which are determined primarily by the solubility therein of the epoxy resins, are preferably aromatic solvents such as xylene, toluene and high flash highly aromatic naphthas such as Solvesso 100. Blends with high molecular weight Epon resins (Epon 1001 and higher) may also contain amounts (e.g. from 20 to 60%) of esters e.g., butyl acetate ketones, e.g., methyl isobutyl ketone, alcohols e.g., butanol or ethylene glycol monoethyl ether, sufficient to insure the solubility of the Epon resin.

The following examples will further illustrate the practice of this invention.

*Example 1*

Buton 100, a copolymer of 20 parts of styrene and 80
 parts butadiene (60% 1,2-unsaturated and 40%
 1,4-unsaturated) having a molecular weight of
 8,000 to 10,000 and an iodine number of 300 __g__ 300
Phenol _____g__ 300
Retrol clay, an activated clay having a 21% moisture content and the non-volatile content of which may be broken down as follows:
 $SiO_2$ 70.9; $Al_2O_3$ 17.0%; $Fe_2O_3$ 3.9%; MgO
 3.2%; CaO 1.6%; $SO_3$ 1.8%; $K_2O+Na_2O$
 1.0%; $TiO_2$ 0.6% _____g__ 40
Concentrated sulfuric acid _____cc__ 10
Xylene _____g__ 600

The Retrol clay and the sulfuric acid are mixed to form a slurry. The slurry is then mixed with the Buton 100, phenol and xylene and the mixture is heated to and maintained at 50 to 60° C. for 20 hours under a nitrogen atmosphere. The mixture is permitted to cool to room temperature, and the Retrol clay is removed by filtration under a nitrogen atmosphere. The filtrate is then steam distilled to remove the unreacted phenol overhead. The resulting solution has a 39.5% content of a copolymer comprising about 10% phenol determined by hydroxyl content and 90% Buton 100.

*Example 2*

Buton 100 _____g__ 100
Phenol _____g__ 100
Retrol clay _____g__ 13
Concentrated sulfuric acid _____cc__ 8
Xylene _____g__ 250

Example 1 is repeated using the above ingredients except that the mixture is heated to and maintained at 100° C. for 20 hours. The resulting copolymer has a 31% phenol content determined by hydroxyl content and 69% Buton 100.

*Example 3*

Buton 100 _____g__ 600
Phenol _____g__ 55
Retrol clay _____g__ 30
Concentrated sulfuric acid _____cc__ 10
Xylene _____g__ 800

The Retrol clay and the sulfuric acid are mixed to form a slurry. The slurry is then mixed with the Buton 100, phenol and xylene and the mixture is heated to and maintained at 100° C. for 7 hours under a nitrogen atmosphere. The mixture is then permitted to cool to room temperature, and the Retrol clay is removed by filtration under a nitrogen atmosphere. The filtrate is then steam distilled to remove the unreacted phenol overhead. The resulting solution has a 87.6% content of a copolymer comprising about 3% phenol, determined by hydroxyl content and 97% Buton 100.

*Example 4*

Polybutadiene (60% 1,2-unsaturated and 40%
 1,4-unsaturated) having a molecular weight of
 8,000 to 10,000 _____g__ 600
Phenol _____g__ 250
Retrol clay _____g__ 25
Concentrated sulfuric acid _____cc__ 10
Xylene _____g__ 800

The procedure of Example 3 is repeated using the above ingredients. The resulting copolymer comprises 15% phenol and 85% polybutadiene.

*Example 5*

Buton 100 _____g__ 300
Bisphenol A _____g__ 60
Retrol clay _____g__ 25
Concentrated sulfuric acid _____cc__ 10
Xylene _____g__ 350

The procedure of Example 3 is repeated using the above ingredients. The resulting copolymer comprises 8% bisphenol and 92% Buton 100.

*Example 6*

Polycyclopentadiene resin having a molecular weight
 of from 800 to 1200 in toluene solvent (40%
 solids content) _____g__ 400
Phenol _____g__ 20
Retrol clay _____g__ 25
Concentrated sulfuric acid _____cc__ 10
Xylene _____g__ 455

The procedure of Example 3 is repeated using the above ingredients. The resulting copolymer comprises 95% polycyclopentadiene and 5% phenol.

*Example 7*

Buton 100 _____g__ 300
Phenol _____g__ 60
Retrol clay _____g__ 25
Concentrated sulfuric acid _____cc__ 10
Xylene _____g__ 350

The procedure of Example 3 is repeated using the above ingredients. The resulting copolymer comprises 7% phenol and 93% Buton 100.

*Example 8*

300 g. of a solution comprising a copolymer of 93% Buton 100 and 7% phenol prepared in accordance with the procedure of Example 3 in a xylene solvent (50% solids) are added to 8.16 g. acetic anhydride and the mixture is refluxed for 2 hours at 120° C. under a nitrogen atmosphere. The resulting solution of the acetylated Buton 100-phenol copolymer provides an excellent coating composition for metals.

Example 9

Following the procedure set forth in Example 3, a copolymer comprising 87% Buton 100 and 13% phenol is prepared by reacting 600 g. of Buton 100, 270 g. phenol, 30 g. of Retrol clay treated with 10 cc. of concentrated sulfuric acid and 800 g. of xylene in accordance with the procedure set forth in Example 3. 500 g. of the resulting copolymer solution (31% solids) are admixed with 38 g. of a 40% solution of formaldehyde (0.5 mole) in n-butanol and water (51.5% and 8.5% of the solution respectively), 18 g. of ammonium hydroxide (pH 8 to 9) and 345 g. xylene and the mixture is refluxed at 95° C. for 7 hours under a nitrogen atmosphere. By testing for unreacted formaldehyde, it is determined that 1.5 moles of formaldehyde are incorporated for each mole of phenol. When the reflux time is reduced from 7 to 4 hours, it is found that only 0.8 mole of formaldehyde is incorporated for each mole of phenol.

Example 10

| | G. |
|---|---|
| Copolymer of Example 5 in xylene solution (27% content) | 200 |
| 40% solution of formaldehyde in n-butanol and water (51.5% and 8.5% respectively) | 10 |
| Ammonium hydroxide | 2 |
| Xylene | 146 |

The above ingredients are mixed, heated to and maintained at reflux (95° C.) for 7 hours under a nitrogen atmosphere, 3.0 moles of formaldehyde are incorporated into the polymer for each mole of bisphenol.

Example 11

| | G. |
|---|---|
| Copolymer of Example 3 (97% Buton 100, 3% phenol) | 114 |
| 40% solution of formaldehyde in n-butanol and water (51.5% and 8.5% respectively) | 5 |
| Ammonium hydroxide | 1.5 |
| Xylene | 300 |

The above ingredients are mixed and maintained at reflux (95° C.) for 4 hours under a nitrogen atmosphere. .075 mole of formaldehyde is incorporated into the polymer for each mole of bisphenol present in the polymer.

Example 12

| | G. |
|---|---|
| Copolymer of Example 4 | 105 |
| 40% solution of formaldehyde in n-butanol and water (51.5% and 8.5% respectively) | 1.02 |
| Ammonium hydroxide | 5.0 |
| Xylene | 395 |

The above ingredients are mixed and maintained at reflux (95° C.) for 4 hours under a nitrogen atmosphere. 0.5 mole of formaldehyde is incorporated into the polymer for each mole of phenol present in the polymer.

Example 13

| | G. |
|---|---|
| Copolymer of Example 7 | 84 |
| 40% solution of formaldehyde in n-butanol and water (51.5% and 8.5% respectively) | 10 |
| Ammonium hydroxide | 3 |
| Xylene | 400 |

The above ingredients were mixed and maintained at reflux (95°–100° C.) for 4 hours under a nitrogen atmosphere. 1.5 moles of formaldehyde are incorporated into the polymer for each mole of phenol present in the polymer.

Example 14

7 parts of the copolymer of Example 7 and 1 part of Epon 1001, an epoxy resin, made by reacting Bisphenol A (2,2-diphenol propane) and epichlorohydrin, having a molecular weight of 875, an epoxide equivalent weight of 450–525 and an average of 1.7 to 1.9 epoxides per molecule are blended in a xylene solution (50% solids content). The solution is roller coated on tin plate to give a dry film weight of 3.5 to 4.0 milligrams per square inch and cured at 204.5° C. for 12.5 minutes. The films are well cured, flexible and have good fabrication and steam processing resistance. The films show little blush or discontinuity when contacted with steam at 121° C. for 60 minutes. The coated tin may be bent over an angle of 180° and fabricated into can ends without seriously disrupting the film.

Example 15

Example 14 is repeated under the same conditions using a blend of 6 parts of the copolymer of Example 7 and 1 part of Oxiron 2000 in a xylene solution (50% solids). Oxiron 2000 is an epoxidized hydrocarbon resin having the following repeating unit:

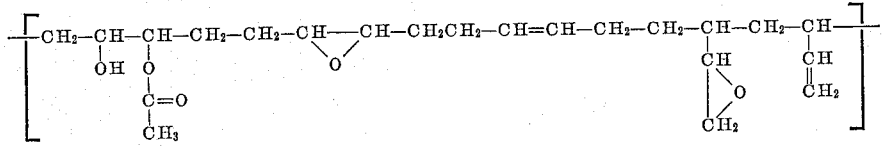

and a molecular weight of from 1200 to 1500, an epoxide equivalent weight of 177, about a 2.5% hydroxyl content and an iodine number of 185. The resulting coated tinplate has properties substantially equivalent to those described with respect to the coated tinplate of Example 14.

Example 16

Example 15 is repeated under the same conditions, proportions and ingredients except that the methylolated copolymer of Example 13 is used in place of the copolymer of Example 7. The results are substantially the same as those in Example 15.

Example 17

9 parts of the acetylated copolymer of Example 8 are blended with 1 part of Oxiron 2000 in a xylene solution (50% solids), coated onto tinplate and cured in accordance with the procedure set forth in Example 14. The resulting coated tinplate has properties which are equivalent to those of the coated plate of Example 14.

Example 18

Example 15 is repeated under the same conditions, proportions and ingredients except that the copolymer of Example 5 is used in place of the copolymer of Example 7. The results are substantially the same as those in Example 15.

Example 19

Example 14 is repeated using the following ingredients: A blend of 97 parts of the copolymer of Example 7 and 3 parts of Epon 828, an epoxy resin, made by reacting Bisphenol A and epichlorohydrin, having an average molecular weight of 350, an epoxide equivalent weight of 175–210 and an average of almost 2 epoxides per molecule. The resulting coated tinplate has the same good properties as the plate of Example 14.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A process for producing resins which comprises alkylating (A) a phenol material with (B) a polymer containing more than 5 repeating units of a material selected from the group consisting of butadiene, lower alkyl substituted butadiene and phenyl substituted butadiene in the presence of a mixture of activated clay and sulfuric acid, said resin having a softening point below 22° C..

2. A process according to claim 1 wherein said phenol material is phenol.

3. A process according to claim 1 wherein said polymer is polybutadiene.

4. A process according to claim 1 wherein said polymer is a copolymer comprising butadiene and styrene.

5. A process according to claim 1 wherein said repeating units are cyclopentadiene units.

6. A process according to claim 1 wherein said phenol is 2,2-diphenol propane.

7. A process for making a methylolated resin which comprises reacting formaldehyde with a resin made by the process set forth in claim 1.

8. The process set forth in claim 1 wherein said resin produced is further reacted with acetic anhydride.

9. The process of claim 1, wherein said sulfuric acid is present in an amount less than 1% of total reactant weight.

References Cited by the Examiner

UNITED STATES PATENTS

| | | | |
|---|---|---|---|
| 2,412,229 | 12/1946 | Schaad | 260—62 |
| 2,843,565 | 7/1958 | Christenson et al. | 260—19 |
| 2,864,868 | 12/1958 | Bader | 260—62 XR |
| 2,932,671 | 4/1960 | Hayer et al. | 260—43 |
| 2,975,216 | 3/1961 | Spacht | 252—436 XR |
| 3,110,699 | 11/1963 | Josten | 260—62 |
| 3,124,555 | 3/1964 | Brown et al. | 260—62 XR |

OTHER REFERENCES

Mantell: "Adsorption," 2d ed. (1951), pp. 64–69.
Lange: "Handbook of Chemistry," 1960, p. 351.

LEON J. BERCOVITZ, *Primary Examiner.*

DONALD E. CZAJA, JOSEPH L. SCHOFER,
*Examiners.*

J. J. KLOCKO, *Assistant Examiner.*